United States Patent [19]

Pavlovsky et al.

[11] Patent Number: 4,602,233

[45] Date of Patent: Jul. 22, 1986

[54] APPARATUS FOR TRANSMITTING FORCE FROM ACTUATING ELEMENT OF AN ELECTROMAGNET TO A COMPONENT

[76] Inventors: Rudolf Pavlovsky, Plattenweg 53, CH-8200 Schaffhausen, Switzerland; Pavel Drazan, 67, Millrace Close, Lisvane, CF4 & UQ Cardiff, United Kingdom

[21] Appl. No.: 737,199

[22] Filed: May 23, 1985

[30] Foreign Application Priority Data

May 24, 1984 [CH] Switzerland ................ 2539/84

[51] Int. Cl.$^4$ .............................................. H01F 7/08
[52] U.S. Cl. ........................................ 335/258; 335/270
[58] Field of Search .............. 335/255, 258, 262, 269, 335/270, 274

[56] References Cited

U.S. PATENT DOCUMENTS 3,249,823  5/1966  Beardow ........................... 335/258
4,114,125  9/1978  Komatsu ........................... 335/258
4,419,642 12/1983  Kramer et al. ................. 335/258 X Primary Examiner—George Harris
Attorney, Agent, or Firm—Marmorek, Guttman & Rubenstein

[57] ABSTRACT

An apparatus is disclosed for transmitting force from an actuating element of an electromagnet to a component to be actuated. The actuating element and the component to be actuated are substantially axially aligned. The lever is supported upon and rotates about a stop which is at a predetermined distance from both the push-pin axis and the axis of the component. When the point of contact of the lever with the push-pin is closer to the axis of the component than the point of contact of the lever with the component, the apparatus provides a mechanical advantage greater than 1. As a result, the component is moved with an enhanced force in the initial stages of its movement. In a preferred environment, several levers are arranged symmetrically about the axis of the component to be actuated to reduce cross-forces.

12 Claims, 17 Drawing Figures

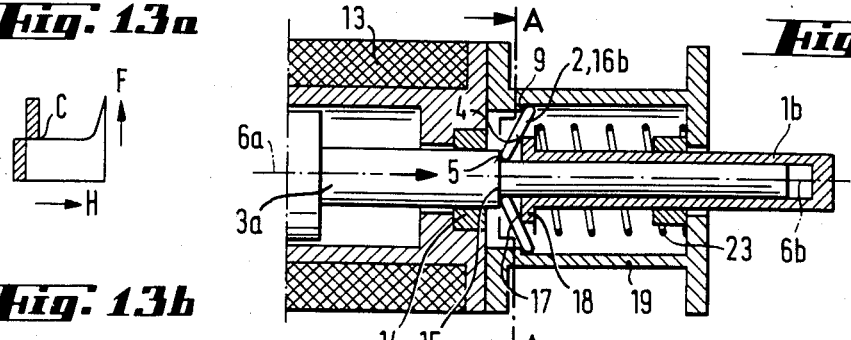
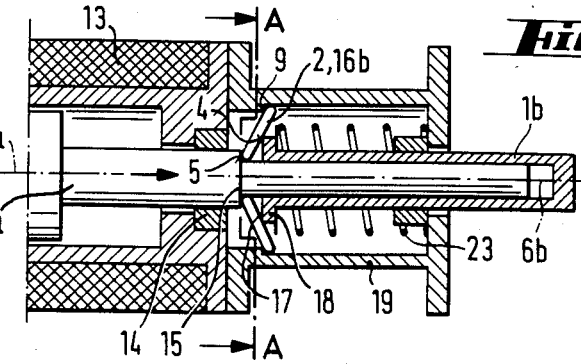
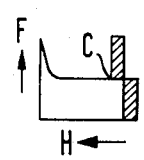
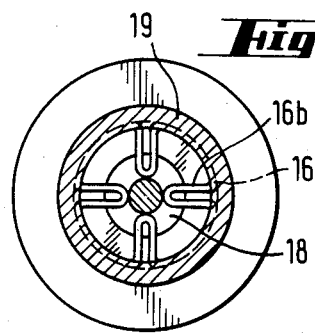
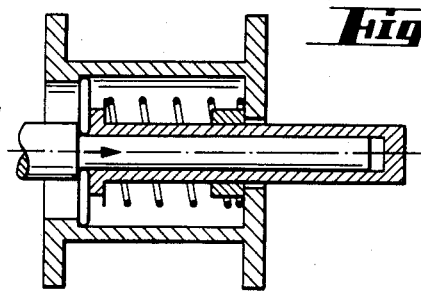
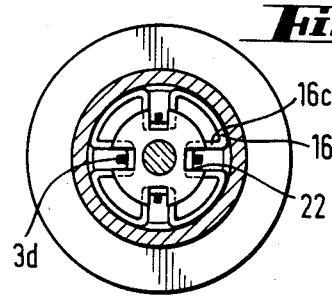
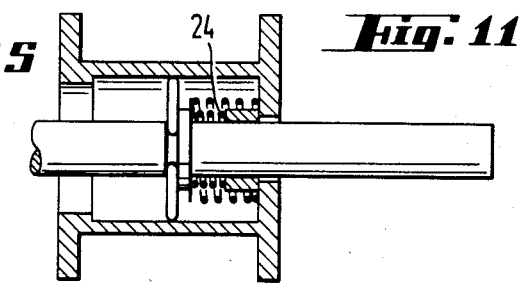
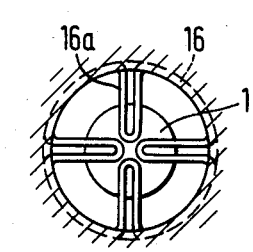
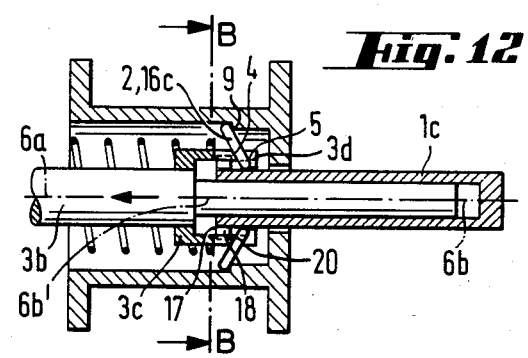

APPARATUS FOR TRANSMITTING FORCE FROM ACTUATING ELEMENT OF AN ELECTROMAGNET TO A COMPONENT

BACKGROUND OF THE INVENTION

This invention relates to an apparatus for transmitting force from an actuating element of an electromagnet to a component to be actuated. More particularly, this invention relates to an apparatus wherein a lever mechanism is interposed between a moving element of the electromagnet, such as an armature or a push-pin, and an element to be actuated by the electromagnet. The lever mechanism includes a lever which is in contact with the actuating element of the electromagnet and the component to be actuated. The lever rotates about a stop which is spaced at a distance from the axially aligned actuating element and the component to be actuated.

Heretofore, the stroke/force effect of an electromagnet transmitted to a component to be actuated have been unfavorable. This is because the force which is transmitted to the component to be actuated is small at the beginning of the stroke and large at the end of the stroke, whereas the reverse situation is more desirable.

In the construction of electromagnets which are used to actuate different components, e.g., valves, sorting points, slides, flaps, locking mechanisms, etc., one always encounters the problem that a large force is needed initially in order to start the motion of the component to be actuated. In order to overcome static friction and the inertia of a resting body, it is often necessary to provide up to twice as much force as will be needed once the component is in motion. In addition, there are other factors which must be taken into account in determining how much force must be provided, such as whether the components to be actuated are in some manner clamped, the viscosity of any lubricants, acceleration forces, etc.

In order to overcome these resistance factors, one must ensure that the electromagnet provides a large initial force. Because of this, the electromagnets which are employed must be larger than would otherwise be the case. Such electromagnets are also more costly, heavier, and consume more current because the large initial force is only required during a small portion of the entire stroke of the component to be actuated.

SUMMARY OF THE INVENTION

It is the object of the present invention to overcome such disadvantages by providing an apparatus in which a large initial force can be transmitted from an actuating element of an electromagnet to a component to be actuated.

In accordance with the present invention, an apparatus for transmitting force from an actuating element of an electromagnet to a component to be actuated comprises a lever mechanism interposed between and in contact with the actuating element and the component to be actuated. The lever mechanism includes a lever adapted to be rotated about a stop spaced at a predetermined distance from the axis of alignment of the element and the component. When the lever contacts the actuating element at a point which is closer to the axis of the component than the lever's point of contact with the component, a mechanical advantage or force transmission ratio greater than 1 is provided. Thus, an enhanced initial force is provided. When, however, the point of contact of the lever with the component is closer to the axis than the point of contact of the lever with the actuating element, a mechanical advantage less than 1 is provided.

Further advantageous embodiments of the invention are described herein below.

BRIEF DESCRIPTION OF THE DRAWINGS

FIG. 9 shows the initial position of another embodiment of the inv where the mechanical advantage is greater than 1.

FIG. 10 shows another position of the invention shown in FIG. 9.

FIG. 11 shows another position of the invention of FIG. 9.

FIG. 12 shows the initial position of yet another embodiment of the present invention wherein mechanical advantage is greater than 1.

FIGS. 13A and 13B show the relationship between stroke and force on the component to be actuated of the embodiment shown in FIGS. 9 to 12.

FIG. 14 shows a sectional view along line A—A of FIG. 9.

FIG. 15 shows a sectional view along line B—B of FIG. 12.

FIG. 16 shows a sectional view along line C—C of FIG. 3.

DETAILED DESCRIPTION OF THE INVENTION

Figure 1:
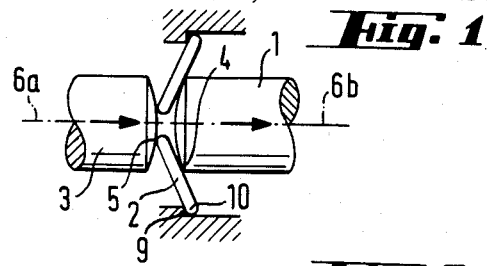
FIG. 1 shows the initial position of one embodiment of the present invention wherein a mechanical advantage greater than 1 is provided.
Figure 2:
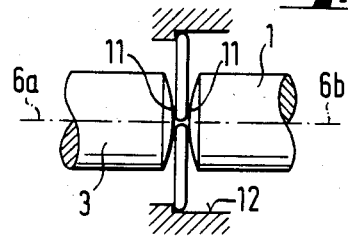
FIG. 2 shows the embodiment of FIG. 1 wherein a mechanical advantage equal to 1 is provided.
Figure 3:
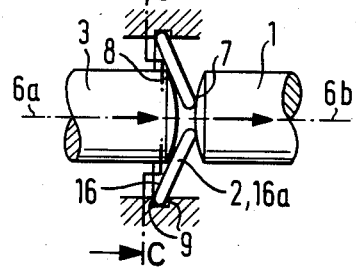
FIG. 3 shows the final position of the embodiment of FIG. 1 wherein a mechanical advantage less than 1 is provided.

In FIGS. 1–3 there is shown the simplest embodiment of the apparatus of the present invention. A lever 2 is interposed between a component 1 to be actuated and a push-pin 3 which is actuated by the armature of an electromagnet. The lever 2 is in contact with push-pin 3 at a support point 5 and is also in contact with component 1 at the support point 4. Push-pin 3 and component 1 are substantially co-axial, having axes 6a and 6b respectively. An end 10 of lever 2 is supported on a stop 9 which is spaced at a predetermined distance from push-pin axis 6a and component axis 6b. Because the point of contact 5 of lever 2 with push-pin 3 is closer to component axis 6b than the point of contact 4 is with component axis 6b, the push-pin acts on component 1 with a force transmission ratio or mechanical advantage of i>1.

From the law of levers, it is known that $F_1 r_1 = F_2 r_2$. As a result, push-pin 3 is able to exert a large initial force on component 1.

As the stroke of push-pin 3 continues in the direction shown in FIG. 1, the force transmission ratio or mechanical advantage i drops to 1. This is shown in FIG.

2 wherein lever 2 makes contact with push-pin 3 and component 1 at support points 11. The lever too, thus changes its orientation with component axis 6b from a sharp angle, as shown in FIG. 1, to an almost vertical position, shown in FIG. 2.

Figure 6:
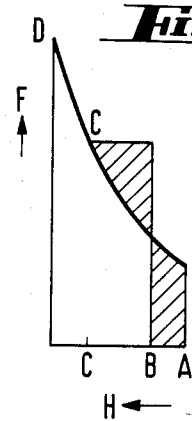
FIGS. 6–8 show the relationship between the stroke and force on the components to be actuated of the embodiment shown in FIGS. 1–5.

The stroke/force effect on component 1 of the apparatus shown in FIGS. 1 and 2 is illustrated in FIG. 6. In FIG. 6, the reference H designates the stroke or distance traveled and F designates the force. The heavy line shows the relationship between stroke and force in the absence of the lever mechanism of the present invention. As can be seen, the force is low initially and is high at the end of the stroke. The shaded area shows how the apparatus changes the force transmitted to component 1 as a result of the present invention. The shaded area above the curve designates the enhanced force from the present invention. The point designated C indicates the position arrived at in FIG. 2. As can be seen, the stroke or distance traveled by push-pin 3 (AC) is longer than the distance traveled by component 1 (BC).

If no further adaptations of the apparatus are made, the effect of the lever mechanism at point C is switched off by the shifting of the lever 2 in guideway 12. The stroke/force effect on component 1 than proceeds as if no lever mechanism were interposed. The maximum force on component 1 is achieved at the end of the stroke at point D. However, the apparatus of the present invention may be further adapted by constructing stop 9 so that it provides dual-sided support (FIG. 3). In this embodiment, further movement of push-pin 3 in the direction of the arrow shown in FIG. 3 results in lever 2 having a point of contact 8 with push-pin 3, and a point of contact 7 with component 1. The value of the force transmission ratio i thus drops below 1.

Figure 7:
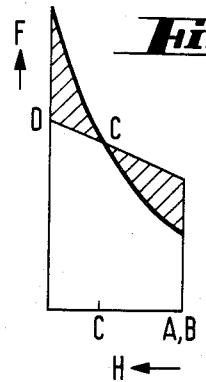

The stroke/force effect on component 1 of the apparatus shown in FIG. 3 is illustrated in FIG. 7. As shown, the final force D of push-pin 3 on component 1 is much lower than in the absence of the present invention. In FIG. 7, the distance traveled by push-pin 3 and component 1 are equal as shown. In addition, the maximum force which is exerted on component 1 corresponds to point D.

Figure 4:
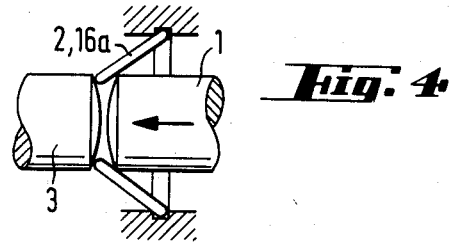
FIG. 4 shows another view of an embodiment similar to that shown in FIG. 3.
Figure 5:
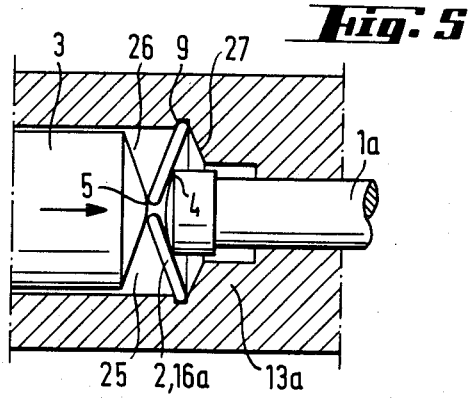
FIG. 5 shows the initial position of another embodiment of the invention.
Figure 8:
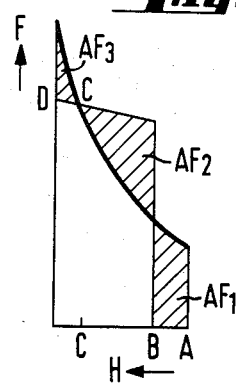

In FIG. 8 the stroke/force effect of the apparatus shown in FIG. 3 is illustrated from its initial position to its final position. This is essentially the sum of FIGS. 6 and 7, and illustrates the optimum transmission of the force from the electromagnet, e.g., as exerted upon a valve slide. So as to avoid cross-forces on component 1, it is advantageous to arrange several levers symmetrically or in mirror-image fashion about component axis 6b. As shown in FIGS. 4 and 16 the individual levers can preferably be joined together by a connection piece 16. It is further advantageous to construct the levers 2 and the connection pieces 16 from, e.g., a spring steel wire, to form a rosette 16a as shown in FIG. 3 and 16. In FIG. 5, an apparatus of the present invention is shown having a rosette 16a of levers 2. In this arrangement, the rosette 16a is located in a hollow space 25 between the body 13a of an electromagnet and an armature 3. The front face 26 of armature 3 is conical in shape and is adapted to be received by a receiving surface 27 of body 13a. This particular arrangement reduces the air gap at the end of the stroke of armature 3. An air gap only remains in the hollow space of rosette 16a between levers 2.

FIG. 9 illustrates an apparatus of the present invention which is adapted to be used with a push electromagnet in which component 1b is actuated. As is conveniently known, an electromagnet 13 having an armature with a push rod 3a is mounted on two bearings 14. Push rod 3a is provided with a step 15 as a result of which the forward portion of push rod 3a has a smaller diameter than the rear portion of push rod 3a. The component to be actuated 1b is in the form of a tappet. As shown in FIG. 9, tappet 1b is disposed about the forward portion of push rod 3a. Between the step 15 of push rod 3a and stop 9 of housing 19, there is provided a rosette 16b of levers 2. Rosette 16b of FIG. 9 is also illustrated in FIG. 14.

Initially, levers 2 of rosette 16b are disposed at a sharp angle to component axis 6b. The individual levers 2 are in contact with step 15 of push rod 3a at support points 5, while at the same time are in contact with collar 18 of component 1b at support points 4. As a result, this arrangement provides a mechanical advantage or force transmission ratio of i>1. The component 1b is moved at the beginning of the stroke under an enhanced force as illustrated by the shaded area above the curve in FIG. 13a.

As the stroke of push rod 3a continues, levers 2 reach a vertical position relative to component axis 6a as illustrated in FIG. 10. At this point, the lever mechanism provides no mechanical advantage, i.e., i=1. The remaining movement of tappet 1b then comes under the direct force effect of the electromagnet 13 as shown in FIG. 11. When, for example, the entire stroke of electromagnet 13 is 20 mm, the entire stroke of tappet 1b will amount to about 17 mm. At the same time, the force on component 1b is doubled during the first 3 mm of the stroke due to the apparatus of the present invention. In this 3 mm of clearance, the elements transmitting the force must also be taken into account, so that the actual distance needed for catapulting component 1b is about 2–2.5 mm.

The apparatus of the present invention may also be adapted for use with a pull electromagnet as shown in FIG. 12. In this embodiment, the collar 18 of component 1c contains a plurality of recesses 22 (shown in FIG. 15). These recesses 22 align with the levers 2 of rosette 16c. Arms 3d of cam 3c secured on pull rod 3b are guided through recesses 22. The levers 2 of rosette 16c are inclined at a sharp angle to the portion 6b' of component axis 6b at the initial position. When pull rod 3b begins to move in the direction shown, the pull force of arms 3d on component 1c is increased with a force transmission ratio of i>1 due to the intervention of levers 2 of rosette 16c. As in the case of the push electromagnet of FIGS. 10 and 11, the effect of the lever mechanism terminates subsequent to the initial force boost provided.

In another embodiment, the initial force boost of this invention can also be applied to rotary magnets. In such case, the element actuated by the armature of the electromagnet, e.g. a cam, the lever, and the component to be actuated, e.g., a drive shaft, which preferably is mounted on the shaft of the armature, all carry out rotary movements.

In FIG. 16 there is shown a rosette 16a for actuation of a component 1 in the form of a valve slide, as shown in FIG. 3. In this case of the rosette 16a the stop 9 takes the form of a groove 21 and is capable of providing dual-sided support.

In each of the embodiments described above, the components to be actuated, 1–1c, must be brought into their initial position by application of an external force, e.g., as with a spring 23. Since, as shown in FIG. 13, the maximum force applied by the electromagnet is not suppressed, the actuating element can be made to engage with a spring 24 near the completion of the stroke as shown in FIG. 11. The force from the spring can then be used to initiate the return movement of the actuating element.

The apparatus of the present invention is simple and therefore inexpensive to construct. The unfavorable stroke/force effect exerted by the electromagnet to the component to be actuated can be adapted to exert a more favorable effect on the component by means of the apparatus of the present invention. Arranging the levers in the form of a rosette, such as that illustrated in 16$a$–$c$, is very advantageous. When used in conjunction with slide valves, the rosette 16$a$ makes possible an enhanced force at the beginning of the stroke, and also provides a more desirable force at the end of the stroke. (See FIG. 8 wherein $AF_1 + AF_3 = AF_2$.) The force which is exerted on the component to be actuated is therefore transmitted in a more desirable manner by means of the present invention so that the electromagnetic valves employing the present invention have lower power requirements than would otherwise be the case. Mounting the levers 2 in the form of a rosette 16$a$ also has the advantage that, as shown in FIG. 4, the rosette does not get in the way of the valve slide. Furthermore, rosette 16$a$ is able to retain its fixed position throughout the stroke of the actuating element, even after the levers reverse their positions.

The components 1$b$ and 1$c$ can be mounted on elements 3$a$ and 3$b$ for a push-pull and for a rotary electromagnet in the case of a short path or small angle of rotation during the initial force boost. This is also because the self-lubricating bearing 14 is adequate for the remaining relatively long path or large angle of rotation. The effective 2–3 fold increase in the initial force effect on the components 1–1$c$ enables one to use weaker, cheaper electromagnets with smaller current consumption than would otherwise be the case.

While the invention has been described by reference to specific embodiments, this was for purposes of illustration only and should not be construed to limit the spirit or the scope of the present invention.

What is claimed is:

1. An apparatus for transmitting force from an actuating element of an electromagnet to a component to be actuated, said element and said component being substantially axially aligned, comprising a lever mechanism interposed between said element and said component, said lever mechanism including at least one lever rotatable about a stop and having a point of contact with said element and a point of contact with said component, wherein a mechanical advantage greater than one is provided when said point of contact with said element is closer to the axis of said component than said point of contact with said component, and wherein a mechanical advantage less than one is provided when said point of contact with said component is closer to said axis of said component than said point of contact with said element.

2. The apparatus of claim 1 wherein said lever in its initial position forms an acute angle with said component axis.

3. The apparatus of claim 1 wherein said lever mechanism includes a plurality of levers symmetrically arranged about said component axis.

4. The apparatus of claim 1 wherein said lever mechanism includes a plurality of levers arranged in mirror-image fashion about said component axis.

5. The apparatus of claim 1 wherein said lever mechanism includes a plurality of levers, said levers being connected to each other.

6. The apparatus of claim 5 wherein said levers are connected to each other in the shape of a rosette.

7. The apparatus of claim 6 wherein said rosette comprises a wire connecting said levers.

8. The apparatus of claim 1 wherein said stop is in the form of a groove.

9. The apparatus of claim 6 wherein said levers of said rosette are located in a hollow chamber between an end of said element and an end of said component.

10. The apparatus of claim 9 wherein said element comprises a cylindrical structure having a back portion of a predetermined diameter and a front portion of smaller diameter than said back portion.

11. The apparatus of claim 10 wherein said element includes a stop between said back portion and said front portion.

12. The apparatus of claim 11 wherein said levers are symmetrically arranged substantially radially about said axis of said element and said levers are located generally in the area of said step.

* * * * *